United States Patent [19]

Ichihara

[11] Patent Number: 5,270,764
[45] Date of Patent: Dec. 14, 1993

[54] REMOTE CONTROLLED CAMERA SYSTEM PROVIDING INDICATION OF FLASH CAPABILITY

[75] Inventor: Yoshiro Ichihara, Kanagawa, Japan

[73] Assignee: Canon Kabushiki Kaisha, Tokyo, Japan

[21] Appl. No.: 657,650

[22] Filed: Feb. 19, 1991

[30] Foreign Application Priority Data

Feb. 20, 1990 [JP] Japan .................. 02-039024
Apr. 27, 1990 [JP] Japan .................. 02-113187
May 18, 1990 [JP] Japan .................. 02-128808

[51] Int. Cl.$^5$ ............... G03B 13/36; G03B 15/05; G03B 17/38; G03B 17/40
[52] U.S. Cl. ............... 354/403; 354/127.11; 354/266; 354/238.1
[58] Field of Search ............... 354/127.11, 127.12, 354/266, 237, 238.1, 403, 418

[56] References Cited

U.S. PATENT DOCUMENTS

| 3,686,672 | 8/1972 | Ishizuka ............... 354/266 X |
| 4,272,176 | 6/1981 | Maitami et al. ............... 354/238.1 |
| 4,295,717 | 10/1981 | Kitagawa ............... 354/127.12 X |
| 4,459,008 | 7/1984 | Shimizu et al. ............... 354/238.1 X |
| 4,816,855 | 3/1989 | Kitaura et al. ............... 354/266 X |
| 4,908,649 | 3/1990 | Matsui et al. ............... 354/238.1 X |
| 5,014,079 | 5/1991 | Kakita ............... 354/266 |
| 5,047,793 | 9/1991 | Shiomi ............... 354/266 X |

Primary Examiner—W. B. Perkey
Attorney, Agent, or Firm—Robin, Blecker, Daley & Driscoll

[57] ABSTRACT

This invention relates to a camera which permits a shutter release operation to be performed by means of a remote-control device. The invention provides a camera system which has a display device for informing a photographer positioned at a location remote from the camera system of the state of a photographic preparatory operation, such as the state of charging of a flash unit, when the camera system is in a mode which permits its shutter release operation to be performed in response to a signal from the remote-control device. The camera system realizes a display suitable for use in remote-controlled photography.

27 Claims, 9 Drawing Sheets

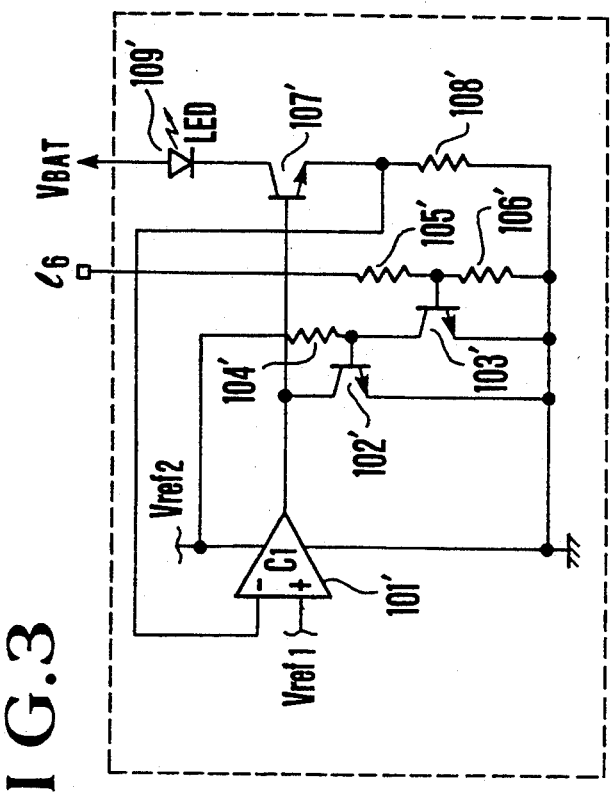
FIG.3
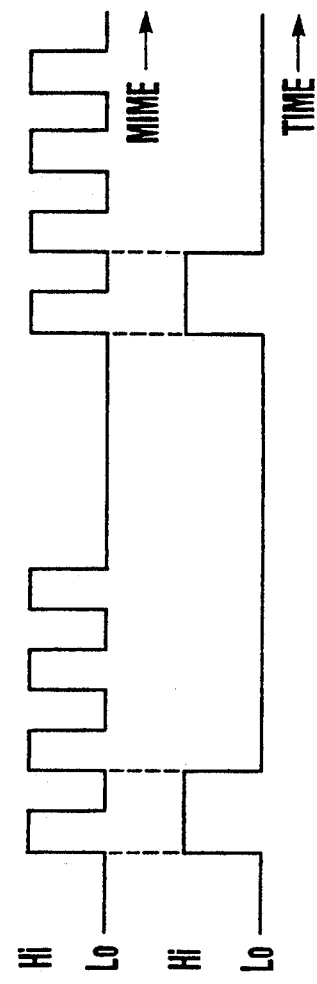
FIG.4(a)
FIG.4(b)

REMOTE CONTROLLED CAMERA SYSTEM PROVIDING INDICATION OF FLASH CAPABILITY

BACKGROUND OF THE INVENTION

1. Field of the Invention

The present invention relates to a camera system and, more particularly, to a camera system provided with at least a wireless receiving means and a flash unit.

2. Description of the Related Art

In recent years, a camera system of the type which incorporates a wireless remote-control-signal receiving circuit, i.e., a wireless receiving circuit, has been proposed. Another proposed type of camera system incorporates, in addition to such a wireless remote-control-signal receiving circuit, a detachable wireless remote-control-signal transmitting circuit. Of these camera systems, particular types are arranged to effect a shutter release operation in response to an output signal from a wireless remote-control-signal transmitting circuit.

In the field of autofocus camera systems, it has recently been proposed to provide a flash unit or a camera system with an autofocus auxiliary-light circuit which emits light under low-luminance conditions.

These types of camera systems are commonly designed to incorporate a flash unit as a built-in element or to be externally fitted therewith.

Camera systems fitted with flash units are convenient for flash photography. However, if a user is to release the shutter of such a camera system by using a wireless remote-control-signal transmitting device, the user who is operating the wireless remote-control device cannot judge whether the externally attached flash unit or the built-in flash unit has been charged to the energy level required for flashing. In other words, since an indication of the completion of charging of the flash unit is displayed in the viewfinder of the camera system, the operator of the wireless remote-control device, who is positioned away from the camera system, cannot judge whether the charging has been completed. In general, cameras have an arrangement in which a shutter release operation is permitted after the charging of the flash unit has been completed. Accordingly, if the operator is to release the shutter of the camera system by using the wireless remote-control device, no shutter release operation will be executed until the flash unit is completely charged. However, since the operator cannot view an indication of the completion of charging for the above-described reason, he cannot understand why no shutter release operation is immediately started. In other words, the operator of the wireless remote-control device cannot understand whether the reason why the camera system does not start a shutter release operation is that the charging of the main capacitor of the externally attached flash unit or the built-in flash unit has not yet been completed, that the battery of the wireless remote-control device has been consumed, or that the operator is outside of the communicable range of the camera system.

SUMMARY OF THE INVENTION

It is, therefore, an object of the present invention to provide a camera system which can inform an operator of a wireless remote-control device of the state of a photographic preparatory operation, for example whether a flash unit is completely charged and ready for flashing, when the operator is using the wireless remote-control device, i.e., a wireless device.

To achieve the aforesaid object, in accordance with one aspect of the present invention, there is provided a camera system which includes a camera body, wireless receiving means provided in the camera body, wireless detecting means for detecting whether a wireless device is in use, main-capacitor charged-voltage detecting means for outputting a charging completion signal, display means, wireless transmitting means, and a flash unit. When it is determined through the wireless detecting means that the wireless device is in use, the display means displays the state of charging.

Another object of the present invention is to provide a camera system which can provide a display of the state of charging by using display means for emitting light or the like in a direction forward of the camera system, such as a self-timer display device or an auxiliary light source for emitting auxiliary light toward a subject during an autofocus (AF) operation.

Another object of the present invention is to provide a camera system in which the operational state of an auxiliary light source during an AF operation or that of a self-timer display device during self-timer photography is made different from the operational state of the auxiliary light source or the self-timer display device during the display of the state of charging to thereby permit a photographer to distinctly identify an indication of the state of charging.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3 is a schematic circuit diagram showing the construction of the AF auxiliary-light circuit used in the embodiment of FIG. 1;

FIGS. 4(a) and 4(b) are explanatory views showing drive signals to be applied to the AF auxiliary-light circuit;

DETAILED DESCRIPTION OF THE PREFERRED EMBODIMENTS

Preferred embodiments of the present invention will be described below in detail with reference to the accompanying drawings.

Figure 1:
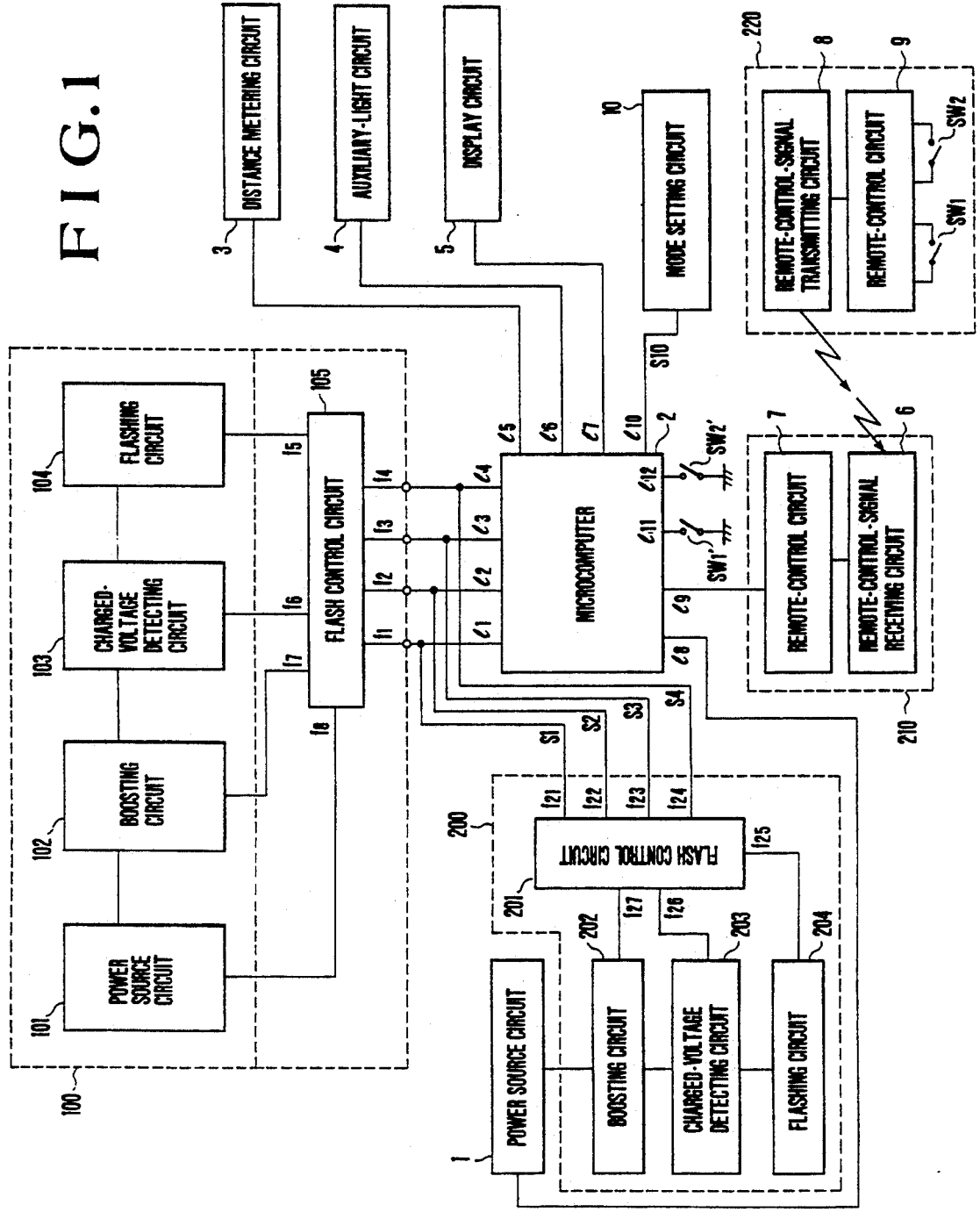
FIG. 1 is a schematic circuit diagram showing one embodiment of a camera system according to the present invention.

Referring to FIG. 1, one embodiment of a camera system according to the present invention comprises a power source circuit 1 including a power source battery, and a one-chip microcomputer 2 including various circuits such as an input/output control circuit for control of the camera system, an analog-to-digital converter, a digital-to-analog converter and a memory circuit. The one-chip microcomputer 2 is provided with a number of functions such as the function of determining whether a flash photography mode or a wireless remote-control mode is active, and the function of detecting whether the charged voltage of the main capacitor of a flash device has reached a predetermined voltage. These functions will be described later in detail in connection with the operation of the embodiment.

The camera body of the camera system is provided with an autofocus distance-metering circuit 3, an autofocus distance-metering auxiliary-light circuit 4 for emitting auxiliary light in a direction forward of the camera system, a display circuit 5, and the like. The circuits 3, 4 and 5 are connected to ports 15, 16 and 17 of the one-chip microcomputer 2, respectively.

A remote-control-signal receiving circuit 6 which constitutes a wireless receiving means is incorporated in the camera body. The circuit 6 is connected to a port 19 of the one chip microcomputer 2 via a remote-control circuit 7. The remote-control-signal receiving circuit 6 and the remote-control circuit 7 constitute a wireless remote-control-signal receiving part 210.

A wireless remote-control-signal transmitting part 220 which constitutes a wireless signal transmitting means consists of a wireless remote-control-signal transmitting circuit 8 for outputting a wireless remote-control transmission signal, and a wireless remote-control circuit 9 connected to the circuit 8 for supplying an output signal thereto upon execution of a wireless remote-control operation. The wireless remote-control-signal transmitting part 220 is detachably attached to the camera body. The remote-control circuit 9 is provided with a wireless remote-control switch SW1 for control of AE (automatic exposure) and AF (autofocus) and a wireless remote-control switch SW2 for control of a shutter release operation.

A mode setting circuit 10 for setting the operational state of the camera system is connected to a port 110 of the one-chip microcomputer 2. The mode setting circuit 10 sets a mode for specifying use or non-use of wireless remote control, a desired flash mode and the like by means of a switch (not shown).

The camera system also includes a built-in flash part 200 which operates when the camera system is used as a built-in flash camera, as well as a flash control circuit 201. Terminals f21 to f24 of the flash control circuit 201 are connected to ports 11 to 14 of the one-chip microcomputer 2, respectively. The ports 11 to 14 of the one-chip microcomputer 2 serve as ports for flash control signals. A signal S1 from the port 11 is an oscillation control signal for a boosting circuit 202. When the signal S1 is at its high level (HL), the boosting circuit 202 initiates oscillation to effect boosting. When the signal S1 is switched to its low level (LL), the boosting circuit 202 stops the oscillation. Outputted from the port 12 is a flashing inhibit signal S2, and when the signal S2 is at the level HL, flashing is inhibited, while when it is at the level LL, flashing is permitted. The port 13 is an output port for an X-sync signal S3, and the port 14 is an input port for a charging completion signal S4. The charging completion signal S4 is inputted to the port 14 from the flash control circuit 201, and is switched to the level HL when a charged voltage to permit flashing is reached and to the level LL if charging is not completed.

The built-in flash part 200 is provided with the boosting circuit 202 for the built-in flash unit. The boosting circuit 202 is connected to a terminal f27 of the flash control circuit 201, and oscillates in response to an HL signal supplied from the port 11. A flashing circuit 204 is connected to a terminal f25 of the flash control circuit 201. The flashing circuit 204 consists of various elements such as a main capacitor, a flash discharge tube, a flash trigger circuit and a flash stop circuit. The built-in flash part 200 further includes a charged-voltage detecting circuit 203 for detecting the charged voltage of the main capacitor. Like the other circuits, the charged-voltage detecting circuit 203 is connected to a terminal f26 of the flash control circuit 201.

An externally attached flash part 100 consists of elements similar to those of the built-in flash part 200, i.e., a power source circuit 101, a boosting circuit 102 for an externally attached flash unit, a charged-voltage detecting circuit 103, a flashing circuit 104 and the like. The circuits 101, 102, 103 and 104 are connected to terminals f8, f7, f6 and f5 of a flash control circuit 105, respectively. Terminals f1 to f4 of the flash control circuit 105 are connected respectively to the ports 11 to 14 of the one-chip microcomputer 2 to which is connected the flash control circuit 201 for the built-in flash unit.

Figure 2A:
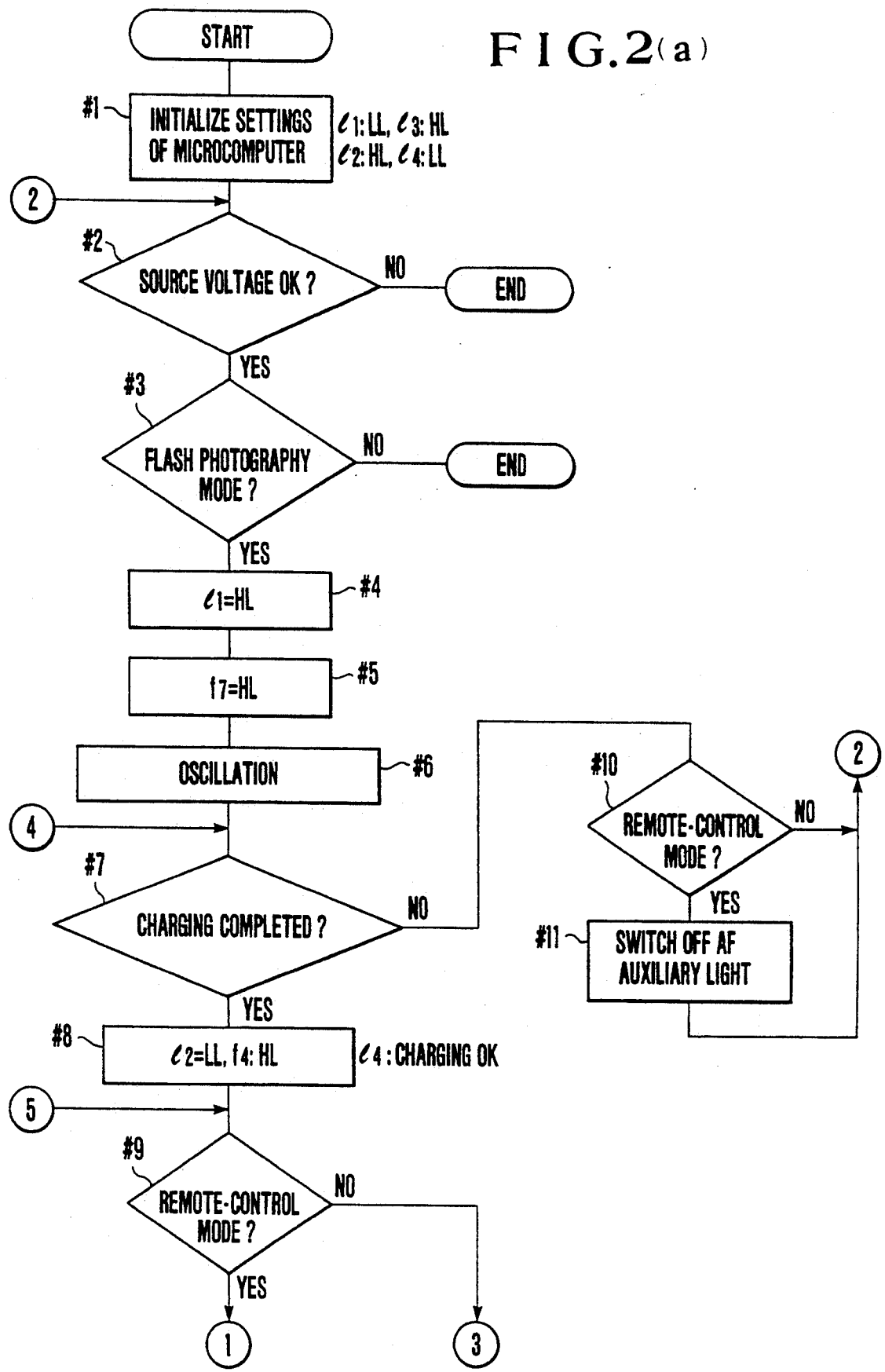
FIGS. 2(a), 2(b) and 2(c) are flowcharts which are used for explaining the operation of the embodiment of FIG. 1.
Figure 2C:
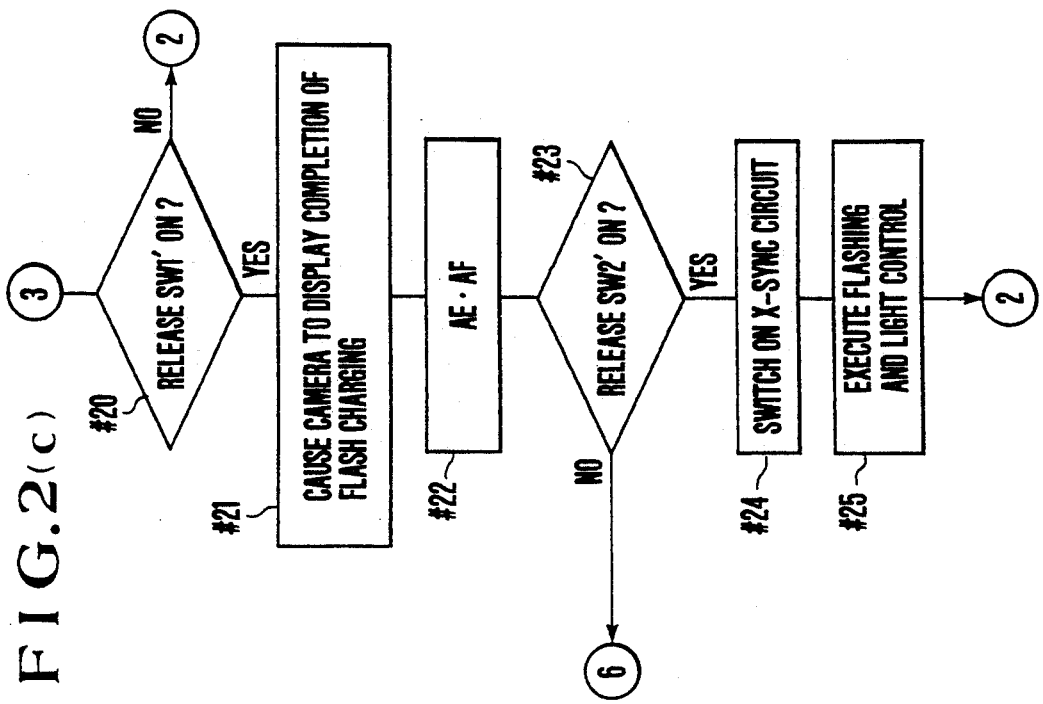
Figure 2B:
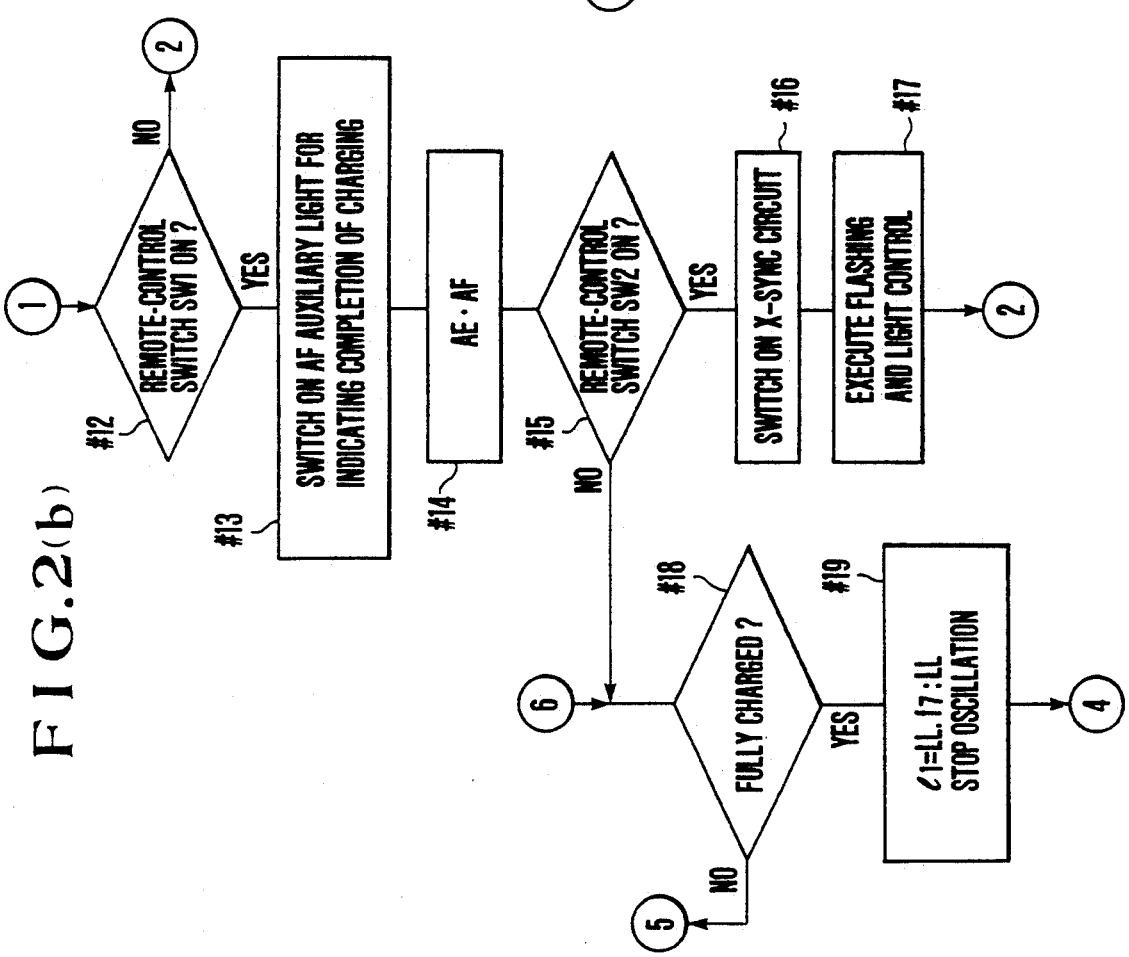

The operation of the above-described embodiment will be described below with reference to FIGS. 2(a), 2(b) and 2(c).

First, reference will be made to the operation of the embodiment when the externally attached flash part 100 is connected to a camera system provided with a wireless remote controller.

By turning on a camera's power switch (not shown), the power source circuit 1 is activated to initialize the one-chip microcomputer 2 (Step #1). By the initialization, the flash control signal S1 outputted from the port 11 is set to the level LL, the flash control signal S2 outputted from the port 12 to the level HL, the X-sync signal outputted from the port 13 to the level HL, and the port 14 to the level LL.

Then, the voltage of the power source circuit 101 is measured by the one-chip microcomputer 2 (Step #2). In Step #2, a battery check is performed, and if the battery is consumed to such an extent that it can no longer charge the main capacitor up to full charge, the operation is ended and the one-chip microcomputer 2 outputs through the port 17 a signal which instructs the display circuit 5 to display the consumption of the battery.

Then, the one-chip microcomputer 2 detects whether the flash photography mode has been selected, on the basis of a signal $S_{10}$ outputted from the mode setting circuit 10 (Step #3). If it is determined in Step #3 that the flash photography mode has been selected, the process proceeds to Step #4. In Step #4, the flash control signal S1 is set to the level HL and the resulting HL signal is inputted to the terminal f1 of the flash control circuit 105. If it is determined in Step #3 that the flash photography mode is not selected, the operation is ended.

Then, the flash control circuit 105 outputs a signal of the level HL from the terminal f7 (Step #5). The boosting circuit 102 initiates oscillation of the externally attached flash part 100 as well as charging of the main capacitor (Step #6).

Then, the charged-voltage detecting circuit 103 is made to detect the charged voltage of the main capacitor, and the one-chip microcomputer 2 determines whether the main capacitor has been fully charged on the basis of the signal S4 of the flash control circuit 105. If the charged voltage of the main capacitor of the flashing circuit 104 reaches a level at which flashing is possible, the process proceeds to Step #8. If charging has not yet been completed, the process proceeds to Step #10 (Step #7).

If charging is completed, the signal S4 of the flash control circuit 105 goes to the level HL (14:HL) and the flashing inhibit signal S2 of the one-chip microcomputer 2 is set to the level LL at which flashing is permitted (Step #8).

Then, whether a wireless remote controller is in use is detected through the mode setting circuit 10 which serves as a circuit for setting the operational state of the camera system. If the wireless remote-control mode is active, the process proceeds to Step #12; otherwise, the process proceeds to Step #20 (Step #9). If it is determined in Step #7 that charging has not yet been completed, whether the wireless remote controller is in use is detected through the mode setting circuit 10 which serves as a circuit for setting the operational state of the camera system. If the wireless remote-control mode is active, the process proceeds to Step #11; otherwise, the process proceeds to Step #2 (Step #10).

If it is determined in Step #10 that the wireless remote-control mode is active, the one-chip microcomputer 2 outputs a signal (LL) from the port 16 to the AF auxiliary-light circuit 4 to switch off the AF auxiliary light, and the process proceeds to Step #2 (Step #11).

In Step #9, if it is determined that the wireless remote-control mode is active, it is determined whether a wireless remote-control switch SW1 is on, which is provided on the wireless remote-control circuit 9 of the wireless remote-control-signal transmitting part 220. (The wireless remote-control circuit 9 is provided with the switch SW1 and a switch SW2 which constitute in combination a two-stroke switch. When the switch SW1 is actuated, an AF or AE operation is executed, and when the switch SW2 is actuated, the shutter of the camera system is released immediately or with a certain time lag. If the switch SW1 is turned on, a remote-control-signal is transmitted from the wireless remote-control-signal transmitting circuit 8 in response to the operation of the wireless remote-control circuit 9. The remote-control signal is received by the remote-control-signal receiving circuit 6 and the microcomputer 2 is informed by the remote-control circuit 7 that the switch SW1 has been turned on. When the ON signal transmitted from the switch SW1 to the microcomputer 2 is detected, the process proceeds to Step #13. If the switch SW1 is off, the process returns to Step #2 (Step #12).

Then, if the wireless remote-controller switch SW1 is on, the one-chip microcomputer 2 outputs a signal (HL) from the port 16 to the AF auxiliary-light circuit 4 to switch on the AF auxiliary light and provide an indication of the completion of charging, and the process proceeds to Step #14 (Step #13).

Then, the automatic exposure (AE) and autofocus (AF) operations of the camera system are performed (Step #14). Subsequently, in Step #15, it is determined whether the wireless remote-controller switch SW2 is on. If is on, the process proceeds to Step #16; while if it is off, the process proceeds to Step #18. The decision as to the state of the switch SW2 is made in a manner similar to that used for the decision as to whether the switch SW1 is on. More specifically, when the switch SW2 is turned on, the ON signal of the switch SW1 is communicated by signal communication from the wireless remote-control-signal transmitting part 220 to the wireless remote-control-signal receiving part 210, and processing similar to the aforesaid one is performed by detecting the ON signal of the switch SW2. If the wireless remote-controller switch SW2 is on, the X-sync signal outputted from the port 13 of the one-chip microcomputer 2 is set to the level LL by the wireless remote-control-signal receiving circuit 6 and the wireless remote-control circuit 7 (Step #16).

In response to the LL signal, the signal from the output terminal f5 of the flash control circuit 105 is transmitted to the flashing circuit 104 to flash the flash discharge tube. When an appropriate quantity of light is reached, light control is executed to stop the flashing, and the process proceeds to Step #2 (Step #17). (If it is determined in Step #15 that the wireless remote-controller switch SW2 is off, charging is continued. If the main capacitor is fully charged, the process proceeds to Step #19; otherwise, the process returns to Step #9 (Step #18).

Then, the flash control signal S4 from the port 11 is set to the level LL, and the resulting LL signal is inputted to the terminal f1 of the flash control circuit 105. In response to the LL signal applied to the terminal f1, the signal from the terminal f7 of the flash control circuit 105 is set to the level LL to stop the oscillation of the boosting circuit 102. The process then proceeds to Step #7 (Step #19).

The following explanation is made in connection with a case where it is determined in Step #9 that a mode other than the wireless remote-control mode is active. In this case, it is determined whether a switch SW1' interlocked with a release operating member of the camera system is on (Step #20). (This embodiment is provided with the switch SW1' and a switch SW2' which constitute in combination a two-stroke switch. The switch SW1' is actuated to execute an AF or AE operation and the switch SW2' is actuated to release the shutter of the camera system.) If it is determined in Step #20 that the switch SW1' is on, the process proceeds to Step #21. If the switch SW1' is off, the process returns to Step #2 (Step #20). Then, the camera system provides an indication of the completion of charging by means of the display circuit 5 (Step #21).

Then, when the automatic exposure(AE) and autofocus (AF) operations of the camera system are performed (Step #22). In Step #23, it is determined whether the release switch SW2' is on. If it is on, the process proceeds to Step #24, while if it is off, the process proceeds to Step #18. If it is determined that the release switch SW2' is on, the X-sync signal outputted from the port 13 of the one-chip microcomputer 2 is set to the level LL (Step #24).

In response to the signal from the output terminal f5 of the flash control circuit 105, the flashing circuit 104 is activated to perform a flashing operation. When an appropriate quantity of light is reached, light control is executed to stop the flashing, and the process proceeds to Step #2 (Step #25).

Although the above explanation refers to the operation of the externally attached flash part 100, it is apparent that the built-in flash part 200 also performs a similar operation, so a further description is omitted. In addition, in the flowchart shown in FIG. 2(a), Step #11 and Step #13 may be reversed in order, that is to say, AF auxiliary light may be switched on before charging is completed, and after completion of the charging, it may be switched off.

FIG. 3 is a circuit diagram showing one example of the circuit construction of the AF auxiliary-light circuit 4 of the camera system shown in FIG. 1. The AF auxiliary-light circuit shown in FIG. 3 constitutes a display device which is one element of the camera system according to the present invention, and represents a partial characteristic of the arrangement of the embodiment of the present invention.

Referring to FIG. 3, a constant voltage Vref1 of the power source circuit 1 is applied to the positive terminal of a comparator indicated by reference numeral 101'. The negative terminal of the comparator 101' is connected to the emitter of an NPN transistor 107'. The comparator 101' is arranged to be driven by a constant voltage Vref2 produced by the power source circuit 1.

The output terminal of the comparator 101' is connected to the collector of an NPN transistor 102' and the base of an NPN transistor 107, The constant voltage Vref2 produced by the power source circuit 1 is applied to the base of the transistor 102' via a resistor 104'. The NPN transistor 107' serves to drive an LED 109' which is a light source for AF auxiliary light. The cathode of the LED 109' is connected to the collector of the transistor 107', and a source voltage VBAT is applied to the anode of the LED 109'

The collector of the NPN transistor 103' is connected to the base of the NPN transistor 102', and voltage-dividing resistors 105' and 106' are connected to the base of the NPN transistor 103'. The base of the NPN transistor 103' is connected to the port 16 of the microcomputer 2 via the resistor 105'.

As is apparent from the above-described circuit construction, lighting of the LED 109' is controlled by the transistor 107', and the transistor 107 is placed under ON-OFF control by the output of the comparator 101' and by switching on or off the transistor 102'. The operation of the transistor 102' is indirectly controlled by the control signal outputted from the port 16 of the microcomputer 2.

The operation of the AF auxiliary-light circuit 4 will be described with reference to FIGS. 3, 4(a) and 4(b).

FIG. 1 4(a) shows a pulse signal whic is applied to the AF auxiliary-light circuit 4 from the port 16 of the microcomputer 2 in order to light up the LED 109' during an AF operation. FIG. 4(b) shows a pulse signal which is applied to the AF auxiliary-light circuit 4 from the port 16 of the microcomputer 2 in order to indicate that the charging of the main capacitor has been completed in the case of flash or remote-control photography.

OPERATION OF CIRCUIT WHEN LED IS OFF

When the LED 109' is off, the output of the port 16 of the microcomputer 2 is held at the level LL. Therefore, since the base of the NPN transistor 103' is at the level LL, the NPN transistor 103' is off. Accordingly, the base of the NPN transistor 102' is at the level HL and the NPN transistor 102' is on. Since the NPN transistor 102' is on, the base of the NPN transistor 107' is at the level LL and the NPN transistor 107' is off. As a result, the LED 109' is held in a non-emitting state.

OPERATION OF CIRCUIT WHEN LED IS ON

Before the LED 109' is turned on, the transistor 107' is off and a voltage of the level LL is applied to the negative terminal of the comparator 101'. As a result, an HL signal is provided at the output terminal of the comparator 101'. At this point in time, if the HL output is developed at the port 16 of the microcomputer 2, the base of the NPN transistor 103' is set to the level HL through the resistor 105' and the NPN transistor 103' is switched on. The base of the NPN transistor 102' is set to the level LL and the NPN transistor 102' is switched off. Accordingly, the base of the NPN transistor 107' is set to the level HL, and the NPN transistor 107' is switched on. At this point in time, the terminal voltage of the resistor 108' increases, and when the negative terminal voltage of the comparator 101' becomes greater than the positive terminal voltage Vref1 of the comparator 101', the output current of the comparator 101' decreases. In consequence, since the base current of the NPN transistor 107' decreases, the collector current and emitter current of the NPN transistor 107' decrease to lower the terminal voltage of the resistor 108'. In this manner, since a constant amount of current flows in the collector and emitter of the NPN transistor 107', the LED 109' emits light under constant conditions.

The arrangement of the above-described embodiment is also such that, if AF auxiliary light is to be emitted during an AF operation, that is, if AF auxiliary light is to be emitted during the execution of Steps #14 and #22 of FIG. 2, a pulse signal having a duty cycle such as that shown in FIG. 4(a) is outputted from the port 16 of the microcomputer 2. This pulse signal is applied to the base of the transistor 103', so that the LED 109' blinks in accordance with the duty cycle of the pulse signal.

During a remote-controlled flash photography, in Step #13, the microcomputer 2 provides, instead of the HL output, a pulse output such as that shown in FIG. 4(b) at the port 16. In consequence, the LED 109' of the AF auxiliary-light circuit 4 blinks in accordance with the emission duty cycle shown in FIG. 4(b).

Accordingly, even if an operator of the wireless remote controller observes the state of emission of AF auxiliary light at a location remote from the camera system, he can easily discriminate between light emission for AF operation and light emission for indicating the completion of the charging of the main capacitor for flash photography.

In the above-described embodiment, in the case of flash photography using the wireless remote controller, the state of charging of the main capacitor is displayed in such a way that the state of blinking of the LED of the AF auxiliary-light circuit is made different from that of blinking which is effected by the LED during an AF operation, that is, in such a way that the duty cycle of light emission of the LED is made different from the duty cycle of light emission which is effected by the LED during an AF operation. However, the amount of emission of the LED for indicating the completion of charging of the main capacitor may be made different from that of emission of the LED for an AF operation. In this case, in the circuit shown in FIG. 3, for example, the reference input voltage Vref1 of the comparator 101' may be made variable. In other words, a voltage varying means may be connected to the input terminal of the comparator 101', the voltage varying means making the voltage Vref1 lower during light emission for indicating that the charging of the main capacitor has been completed than during light emission for providing an in-focus indication in an AF operation. With this arrangement, it is possible to make the terminal voltage of the resistor 108' lower during light emission for indicating that the charging of the main capacitor has been completed than during light emission for providing an in-focus indication in an AF operation. Accordingly, it is possible to make the amount of emission of the LED 109' smaller during the indication of the completion of charging than during the in-focus indication of an AF operation. Accordingly, the operator of the wireless remote controller can be allowed to discriminate between light emission for AF operation and light emission for indicating the completion of the charging of the main capacitor for flash photography. Although, in the above-described embodiment, the AF auxiliary-light circuit 4 is provided in the camera body, it may be provided in the externally attached flash part 100.

Figure 5:
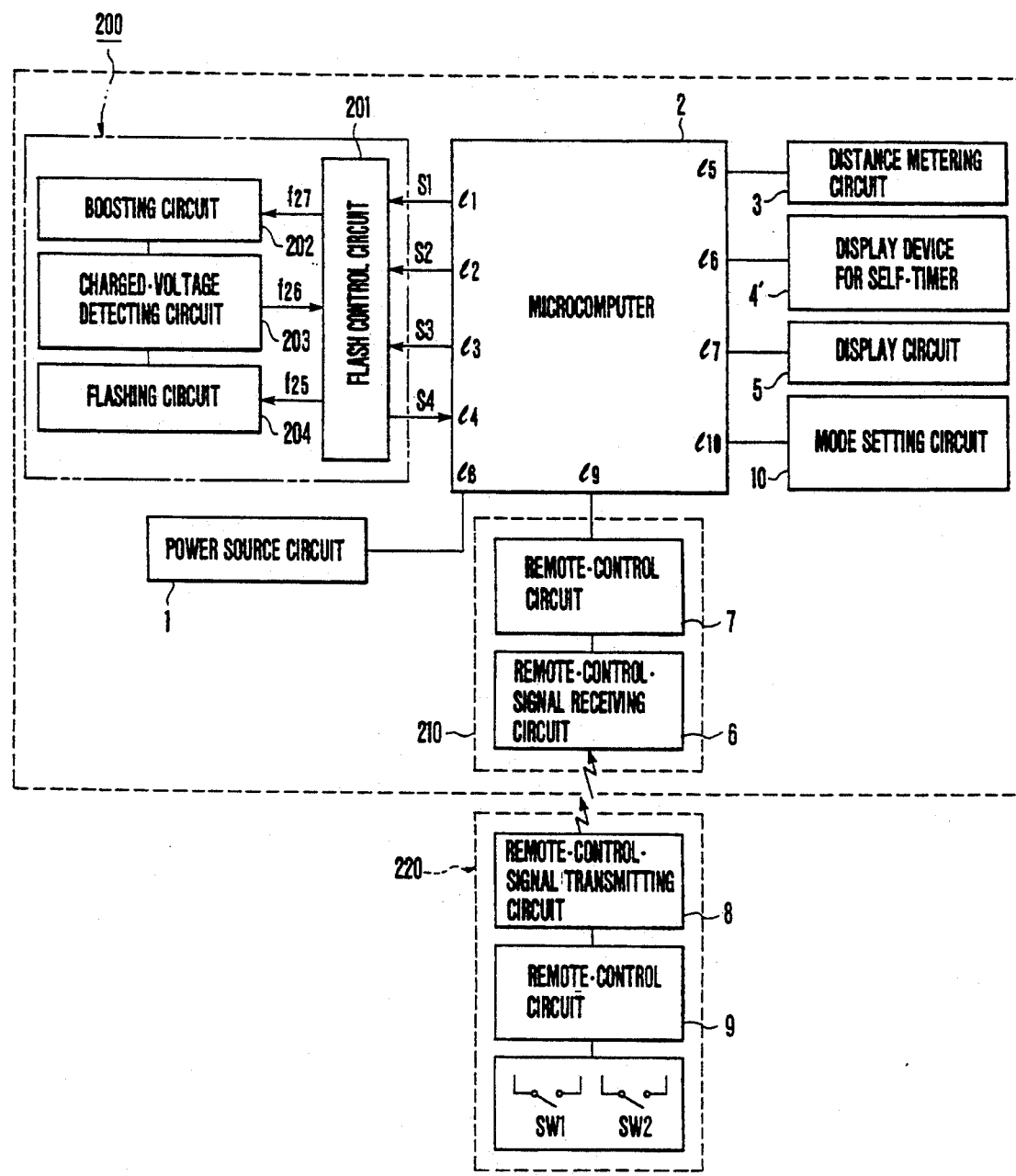
FIGS. 5, 6 and 7 are schematic circuit diagrams showing respectively other embodiments of the present invention.
Figure 6:
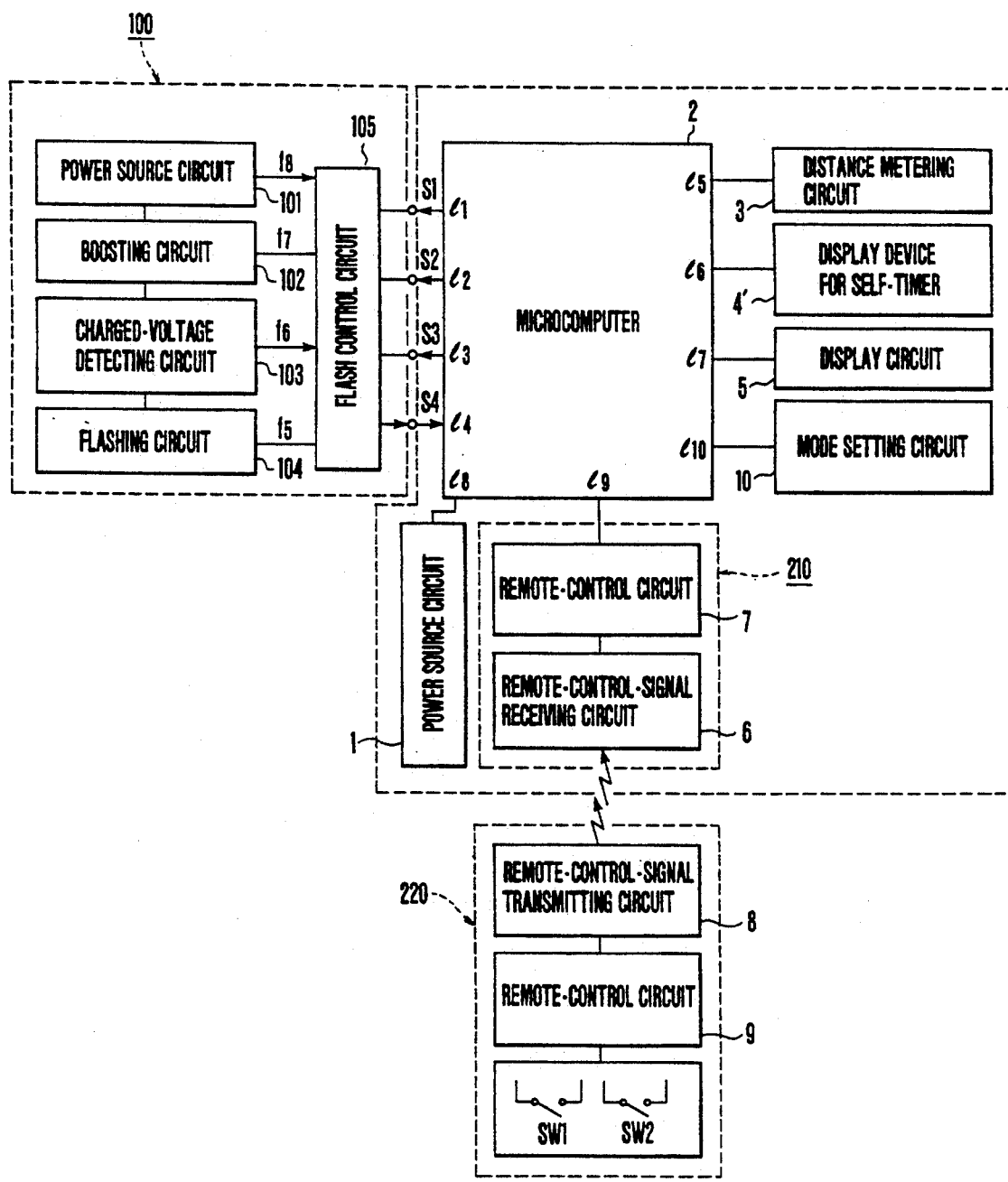

FIGS. 5 and 6 are schematic block diagrams showing respectively other embodiments of the present invention.

In each of these embodiments, the camera system is provided with a a self-timer display device 4' in place of the aforesaid AF auxiliary-light circuit. The self-timer display device 4' has a circuit whose construction is substantially identical to that of the circuit shown in FIG. 3. The self-timer display device 4' is arranged to selectively provide an indication of the time elapsed during photography using a self-timer and an indication of the state of charging of the main capacitor by changing the duty cycle or amount of light emission for each of these indications. Also, emission control signals to be applied from the port 16 of the microcomputer 2 to the self-timer display device 4' are substantially identical to those shown in FIGS. 4(a) and 4(b). In other words, an emission control signal, which is outputted from the port 16 of the microcomputer 2 in the case of an indication of the elapsed time of the self-timer, differs in pulse duty cycle from that which is outputted from the same in the case of an indication of the state of charging of the main capacitor.

Figure 7:
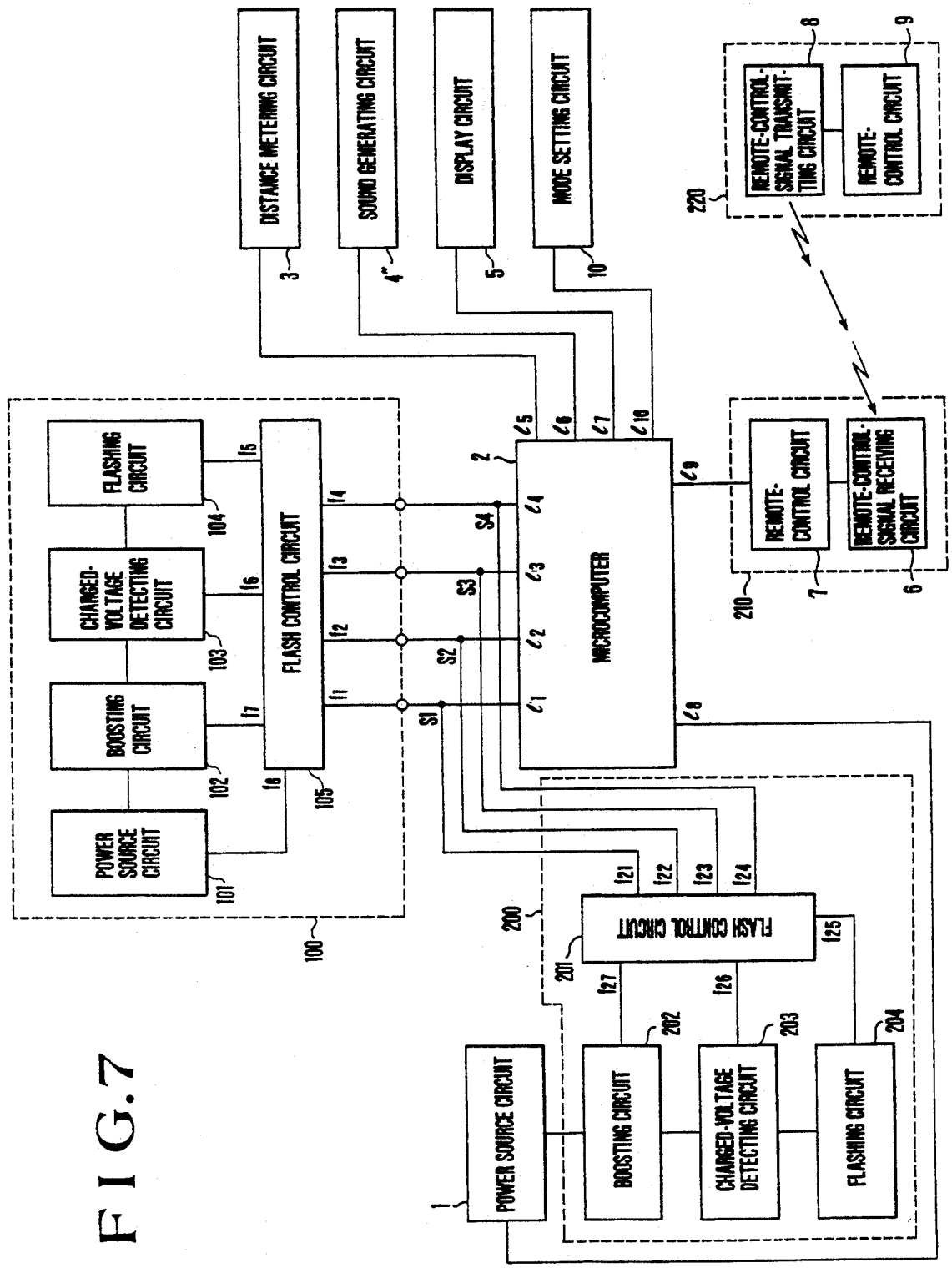

FIG. 7 is a schematic circuit diagram showing another embodiment of the present invention. In FIG. 7, identical reference numerals are used to denote elements which are identical to those used in the embodiment shown in FIG. 1. The embodiment shown in FIG. 7 differs from the embodiment of FIG. 1 only in that a sound generating circuit 4" is used in place of the AF auxiliary-light circuit 4 of FIG. 1.

Figure 8A:
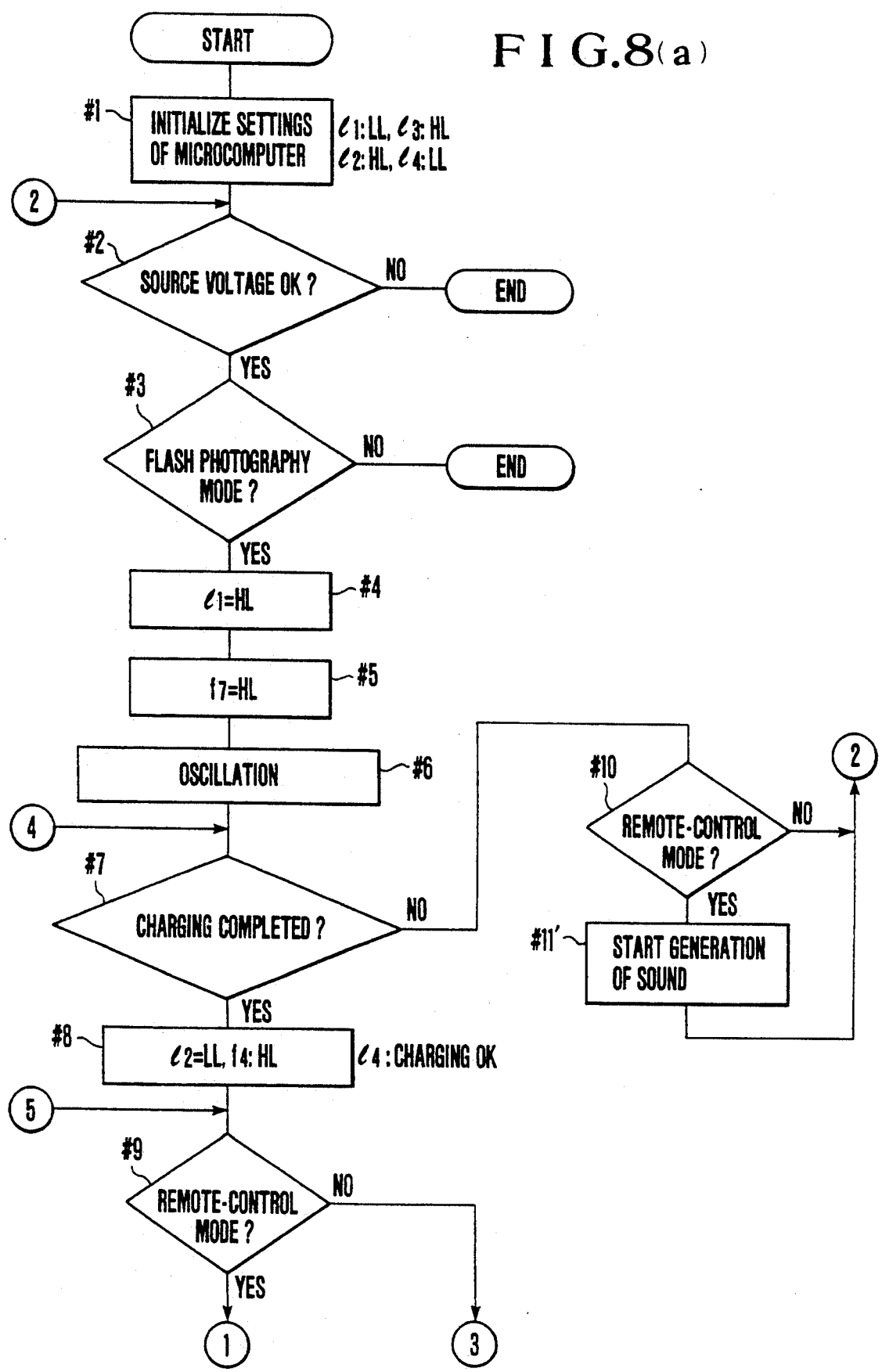
FIGS. 8(a), 8(b) and 8(c) are flowcharts which are used for explaining the operation of the embodiment of FIG. 7.
Figure 8C:
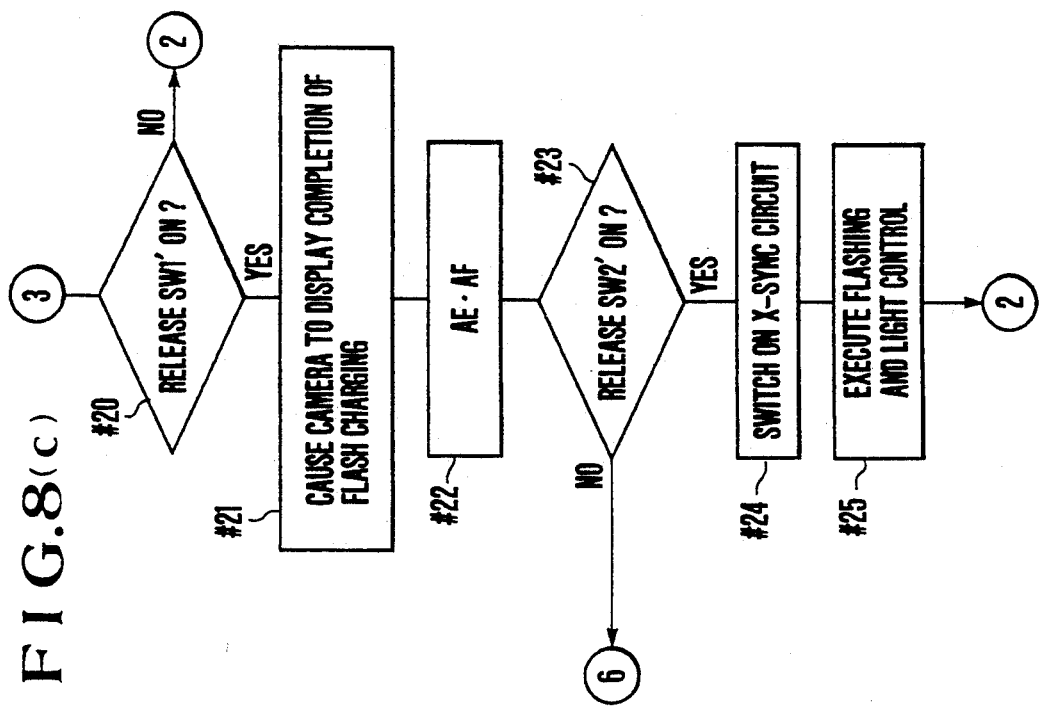
Figure 8B:
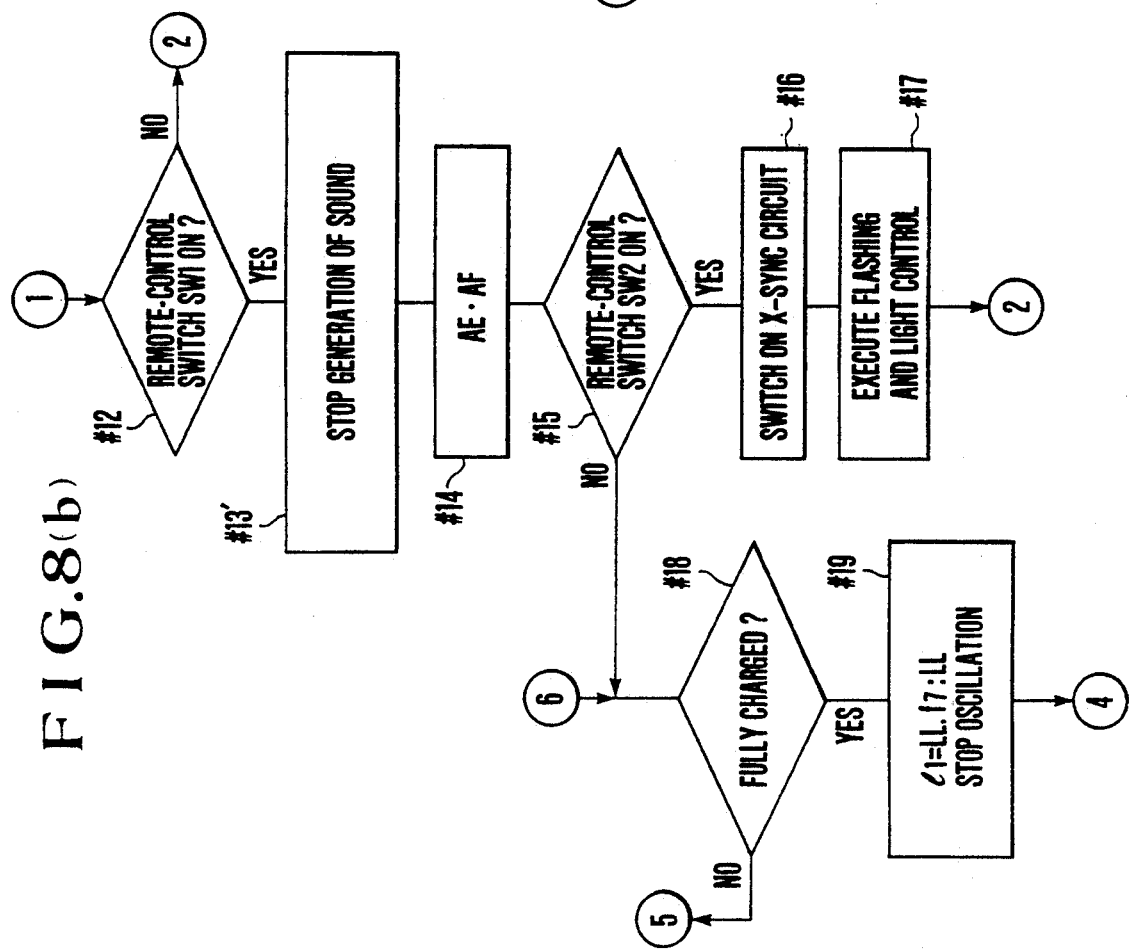

FIGS. 8(a), 8(b) and 8(c) are control flowcharts showing the operation of the embodiment of FIG. 7. In the flowcharts of FIGS. 8(a), 8(b) and 8(c), identical step numbers are used to denote steps which are identical to those shown in the flowcharts of FIGS. 2(a), 2(b) and 2(c). In the flowcharts of FIGS. 8(a), 8(b) and 8(c), if Step #11' is executed, a signal of the level HL is transmitted from the port 16 of the microcomputer 2 to the sound generating circuit 4" to provide an indication utilizing a sound. In Step #13', a signal of the level LL is outputted from the port 16 of the microcomputer 2 to stop the generation of the sound. In this manner, when the remote control mode is selected, the camera system provides an indication utilizing a sound if the main capacitor is being charged.

What is claimed is:

1. A camera system including a camera and a remote-control device, said camera incorporating or being adapted to be externally fitted with a flash unit arranged to effect flashing by using electric charge stored in a main capacitor, and which is arranged to effect a shutter release operation in response to a signal from a remote-control device, said camera system comprising:

(a) a control circuit having a first mode which permits the shutter release operation to be performed by means of said remote-control device and a second mode which permits the shutter release operation to be performed by operation of a shutter release operating member of said camera; and (b) an indication circuit in said camera for providing an indication which represents the state of charging of the main capacitor when said first mode is in operation, said indication circuit being inoperative during said second mode.

2. A camera system according to claim 1, wherein said indication circuit is a display circuit for providing a visible display in a direction forward of said camera.

3. A camera system according to claim 2, wherein said display circuit is a light-emitting circuit for emitting light toward a subject during an autofocus operation.

4. A camera system according to claim 2, wherein said display circuit is a self-timer display circuit.

5. A camera system according to claim 1, wherein said indication circuit is a sound generating circuit.

6. A camera system according to claim 2, further comprising a decision circuit for detecting the state of charging of the main capacitor and determining whether said state of charging has reached a predetermined state, said display circuit switching its type of indication from a first type to a second type different from said first type when said decision circuit determines that said state of charging has reached the predetermined state.

7. A camera system according to claim 5, further comprising a decision circuit for detecting the state of charging of the main capacitor and determining whether said state of charging has reached a predetermined state, said sound generating circuit switching its type of indication from a first type to a second type different from said first type when said decision circuit determines that said state of charging has reached the predetermined state.

8. A camera system according to claim 6, wherein the first type of indication corresponds to a state wherein no display is provided, while the second type of indication corresponds to a state wherein a display is provided.

9. A camera system according to claim 7, wherein the first type of indication corresponds to a state wherein a sound is generated, while the second type of indication corresponds to a state wherein no sound is generated.

10. A camera system according to claim 3, wherein said light-emitting circuit selectively emits light for an autofocus operation and light for indicating the state of charging under different operational conditions.

11. A camera system according to claim 4 wherein said self-timer display circuit displays the state of a self-timer and the state of charging under different display states.

12. A flash unit which can be detachably attached to a camera having a first mode which permits a shutter release operation to be performed in response to a signal from a remote-control device and a second mode which permits the shutter release operation to be performed by operation of a shutter release operating member of the camera, comprising:

(a) a main capacitor for storing electric charge to be used for flashing; and (b) an indication circuit for giving an indication which represents the state of charging of the main capacitor when said first mode is in operation, said indication circuit being inoperative during said second mode.

13. A flash unit according to claim 12, wherein said indication circuit is a display circuit for providing a visible display in a direction forward of said camera.

14. A flash unit according to claim 13, wherein said display circuit is a light-emitting circuit for emitting light toward a subject during an autofocus operation.

15. A camera which can be fitted with a flash unit arranged to effect flashing by using electric charge stored in a main capacitor, comprising:
   (a) a control circuit having a first mode which permits the shutter release operation to be performed by means of a remote-control device and a second mode which permits the shutter release operation to be performed by operation of a shutter release operating member of said camera; and
   (b) an indication circuit for giving an indication which represents the state of charging of the main capacitor when said first mode is in operation, said indication circuit being inoperative during said second mode.

16. A camera according to claim 15, wherein said indication circuit is a display circuit for providing a visible display in a direction forward of said camera.

17. A camera according to claim 15, wherein said indication circuit is a sound generating circuit.

18. A camera of the type wherein a shutter release operation is effected by an operation of a shutter release operation member and the shutter release operation is effected also in response to a signal from a remote control device, comprising:
   (a) a control circuit operably responsive to receipt of said signal from said remote-control device to permit remote control of said camera; and
   (b) an indication circuit for giving an indication which represents the state of a photography preparatory operation other than generation and receipt of said signal from said remote control device when said camera is being remotely controlled, the photographic preparatory operation being performed before an exposure operation, said exposure operation being initiated by the shutter release operation, said indication circuit making no indication representing the state of the photographic preparatory operation when the shutter release operation is effected by the operation of the shutter release operation member.

19. A camera system according to claim 18, wherein said indication circuit is a display circuit for providing a visible display in a direction forward of said camera system.

20. A camera system according to claim 18, wherein said indication circuit is a sound generating circuit.

21. A camera according to claim 18, wherein said indication circuit indicates a charge completion of a flash device.

22. A camera according to claim 21, wherein said indication circuit is a means for projecting light to an object when an autofocus operation of the camera is performed.

23. A flash unit which can be detachably attached to a camera of the type wherein a shutter release operation is effected by an operation of a shutter release operation member and the shutter release operation is effected also in response to a signal from a remote control device, said flash unit comprising:
   (a) a main capacitor for storing electric charge to be used for flashing; and
   (b) an indication circuit for giving an indication which represents the state of charging of the main capacitor, said indication circuit giving the indication when the shutter release operation is effected in response to the signal from the remote control device and not giving the indication when the shutter release operation is effected by the operation of the shutter release operation member.

24. A camera having therein or attachable with a flash unit having a main capacitor for storing electric charge, said camera comprising:
   (a) an auto-focus circuit having light projecting means for projecting light for auto-focusing, and
   (b) a control circuit for operating the light projecting means to indicate the state of charge in the main capacitor.

25. A camera according to claim 24, wherein the light projecting means projects light in a different manner from a light projection for auto-focusing when the light projecting means is operated for indicating the state of charge in the main capacitor.

26. A camera having therein or attachable with a flash unit having a main capacitor for storing electric charge, said camera comprising:
   (a) an indication circuit operable for indicating an operative state of a self timer, and
   (b) a control circuit for operating the indication circuit to indicate the state of charge in the main capacitor.

27. A camera according to claim 26, wherein the indication operation of the indication circuit is performed in a different manner from an indication operation thereof for indicating the operative state of the self-timer when the indication circuit is operated for indicating the state of charge of the main capacitor.

* * * * *

UNITED STATES PATENT AND TRADEMARK OFFICE
CERTIFICATE OF CORRECTION

PATENT NO. : 5,270,764
DATED : December 14, 1993
INVENTOR(S) : Yoshiro Ichihara

It is certified that error appears in the above-indentified patent and that said Letters Patent is hereby corrected as shown below:

Col. 3, line 23.  Change "wireless signal" to -- wireless-signal --

Col. 6, line 12.  Delete "("

Col. 7, line 15.  Change "107," to -- 107! --

Col. 7, line 31.  Change "107" to -- 107' --

Col. 7, line 39.  Change "FIG. 14(a)" to -- FIG. 4(a) --

Signed and Sealed this

Third Day of May, 1994

BRUCE LEHMAN

Attest:

Attesting Officer

Commissioner of Patents and Trademarks